United States Patent Office 2,921,069
Patented Jan. 12, 1960

2,921,069

SUBSTITUTED TRIFLUOROMETHYLPHENO-
THIAZINE DERIVATIVES

Glenn E. Ullyot, Philadelphia, Pa., assignor to Smith Kline & French Laboratories, Philadelphia, Pa., a corporation of Pennsylvania No Drawing. Application April 9, 1956
Serial No. 576,792

12 Claims. (Cl. 260—243)

This invention relates to new 10-(aminoalkyl)-trifluoromethylphenothiazine derivatives. The novel compounds of this invention are of value as therapeutic agents.

More specifically, the compounds of this invention have utility as antiemetics, tranquilizers, antihistaminics, spasmolytics, antishock agents and potentiators of various drugs such as analgetics and anesthetics. When used as tranquilizers, these compounds have the ability to abate mental disturbances such as anxiety, confusion or excitation without physical incapacitation. In addition, these compounds have chemotherapeutic or antimicrobial activity, such as antibacterial and fungicidal activity. Further, the novel compounds of this invention have a surprisingly low degree of toxicity.

The new compounds of this invention are substituted trifluoromethylphenothiazine derivatives represented by the general formula:

when:
Z represents —S— or —SO—,
Y represents trifluoromethyl,
R represents hydrogen, halogen, trifluoromethyl, lower alkyl or lower alkoxyl,
A represents a divalent, straight or branched aliphatic chain containing 2 to 6 carbon atoms, and
$R_1$ and $R_2$ represent either hydrogen, lower alkyl or divalent groups which together with the nitrogen to which they are attached form a five to seven-membered heterocyclic ring, such as pyrrolidinyl, piperazinyl, lower alkyl piperazinyl, piperidyl, thiomorpholinyl, morpholinyl or hexahydroazepinyl.

Advantageous compounds of this invention are represented by the above structural formula when:
Z represents —S—,
Y represents a trifluoromethyl in the 2 or 4 position,
R represents hydrogen, halogen, trifluoromethyl, lower alkyl or lower alkoxy in the 6 or 8 position,
A represents a divalent, straight or branched aliphatic chain containing 2 to 5 carbon atoms, and
$R_1$ and $R_2$ represent either hydrogen, lower alkyl or divalent groups which together with the nitrogen to which they are attached form a five to six-membered heterocyclic ring, such as pyrrolidinyl, piperazinyl, lower alkyl piperazinyl, piperidyl, thiomorpholinyl or morpholinyl.

Still more advantageous compounds of this invention are represented by the above structural formula when:
Z represents —S—,
Y represents trifluoromethyl in the 2 or 4 position,
R represents hydrogen,
A represents either a divalent, straight aliphatic chain containing 2 to 4 carbon atoms or a divalent, branched aliphatic chain containing 2 to 5 carbon atoms, and
$R_1$ and $R_2$ represent either hydrogen, lower alkyl or divalent groups which together with the nitrogen to which they are attached form a five to six-membered heterocyclic ring, such as pyrrolidinyl, piperazinyl, lower alkyl piperazinyl, piperidyl, thiomorpholinyl or morpholinyl.

The preferred compounds of this invention are represented by the structural formula when:
Z represents —S—,
Y represents trifluoromethyl in the 2 position,
R represents hydrogen,
A is a chain represented by the structure $$-CH_2-CH-CH_2-$$
$$\phantom{-CH_2-C}|\phantom{H-CH_2-}$$
$$\phantom{-CH_2-CH}R_3$$

where $R_3$ is hydrogen, methyl or ethyl, and
$R_1$ and $R_2$ taken together represent lower mono- or dialkyl or divalent groups which taken together with the nitrogen to which they are attached form a five to six-membered heterocyclic ring, such as pyrrolidinyl, piperazinyl, lower alkyl piperazinyl, piperidyl, thiomorpholinyl or morpholinyl.

By the terms lower alkyl or lower alkoxyl where used above, aliphatic groups having not more than 4 carbon atoms and preferably not more than 2 carbon atoms, are indicated.

This invention also includes salts of the above defined bases formed with non-toxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicyclic, methylsulfonic, ethanesulfonic, acetic, propionic, tartaric, salicyclic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-chlorotheophylline and 8-bromotheophylline. Exemplary of such inorganic salts are those with hydrochloric, hydrobromic, sulfuric, sulfamic, phosphoric and nitric acids. Of course these salts may also be prepared by the classical method of double decomposition of appropriate salts which is well known to the art.

The compounds of this invention are prepared using trifluoromethylphenothiazine starting materials which are prepared by methods well known to the art and most readily by classical methods of phenothiazine formation, such as thionation of properly substituted trifluoromethyldiphenyl amines, namely, the Bernthsen reaction or by the Smiles rearrangement of substituted 2-amino-2'-nitrodiphenyl sulfides. Reference may be had to "S. P. Massie, Chemical Reviews, 54; 797 (1954)." In the following schemes used to illustrate the methods discussed, X represents halogen and the other symbols are as given in any of the cases given above.

The selected trifluoromethylphenothiazine nucleus may be condensed with a reactive tertiary aminoalkyl ester having the desired aminoalkyl group. The condensation is carried out by refluxing the reactants in an inert aromatic solvent, such as benzene, xylene or toluene, in which at least one of the reactants must be soluble. A suitable acid-binding agent may be included, such as an alkali metal amide, preferably sodium amide or potassium amide; an alkali metal hydroxide, preferably potassium hydroxide; an alkali metal hydride, preferably sodium hydride; or alkali metal aryl or alkyl compounds, preferably phenyl sodium.

The tertiary aminoalkyl ester is preferably used as the free base although the acid addition salts may be used with a corresponding increase in the amount of inorganic base as defined above. Any reactive tertiary aminoalkyl ester containing the desired aminoalkyl group may be used, such as the halides, preferably bromide or chloride, or the sulfonic or sulfuric esters, preferably the p-toluene sulfonate.

The 10 - (aminoalkyl) - trifluoromethylphenothiazines are alternatively prepared by methods which involve chemical modifications of an alkyl chain which has a reactive, terminal group such as a halogen, a carboxy, tosylate, aldehydo or cyano group and which is attached to the 10-position of the parent substituted trifluoromethylphenothiazine. While such methods are conveniently used to prepare 10-(tertiaryaminoalkyl)-trifluoromethylphenothiazines, they are particularly valuable for the preparation of the 10-(ω-primary and secondary aminoalkyl)-trifluoromethylphenothiazine derivatives of the series. These synthetic procedures will be more evident from the following description.

For example, the trifluoromethylphenothiazines substituted in the 10-position with an alkyl chain containing a terminal reactive ester group, such as tosylate, are prepared as in the following procedure. A 2-tetrahydropyranyl ether of a haloalkanol is condensed in an inert solvent, such as xylene, with a substituted trifluoromethylphenothiazine in the presence of an acid binder, such as sodamide, to give a 10-(ω-tetrahydropyranyloxyalkyl) - trifluoromethylphenothiazine. The protective pyranyl group is removed with acid, for example, hydrochloric acid. The resulting 10-(ω-hydroxyalkyl)-trifluoromethylphenothiazine derivative is then esterified with an appropriate acyl halide, such as tosyl (p-toluene sulfonyl) chloride to give the desired reactive ester, in this case the tosylate. The resulting ester is reacted with an amine, preferably in an autoclave at relatively low temperature. This procedure is illustrated in the following scheme:

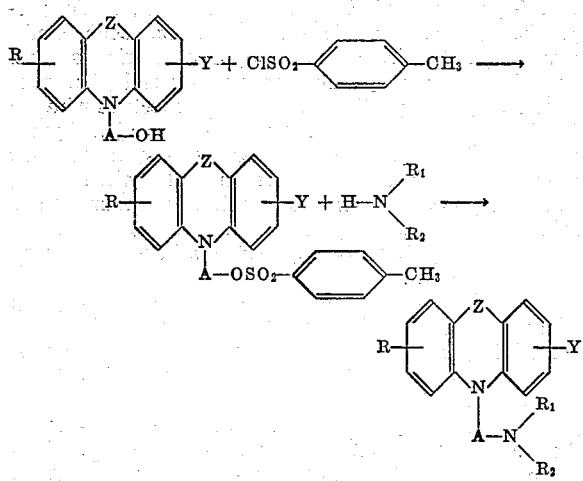

It is, at times, convenient to react the 10-(ω-hydroxyalkyl)-trifluoromethylphenothiazine derivative obtained as hereabove described with a reactive inorganic halide, such as thionyl chloride, thionyl bromide or phosphorous pentachloride, in a non-ionic solvent, such as benzene or xylene, to give a 10-(ω-haloalkyl)-trifluoromethylphenothiazine which is then reacted with an amine preferably in excess or in the presence of an acid binder, such as sodium carbonate in an aqueous alcohol medium.

Alternatively, an ω-phthalimidoalkyl halide can be condensed with the trifluoromethylphenothiazine derivative at the 10-position in the presence of an acid-binder, such as sodamide in an inert solvent, such as xylene. The resulting 10-(ω-phthalimidoalkyl)-trifluoromethylphenothiazine is then hydrolyzed to remove the protective phthalyl group and give the desired primary 10-(ω-aminoalkyl)-trifluoromethylphenothiazine. Further alkylation, by methods described herebelow, yields 10-(secondary or tertiary aminoalkyl) derivatives of the trifluoromethylphenothiazines. This procedure is illustrated as follows:

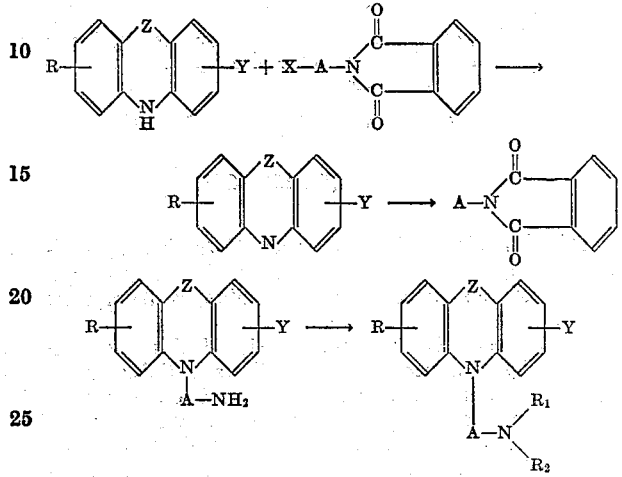

Furthermore, the primary 10-(ω-aminoalkyl)-trifluoromethylphenothiazine derivatives are conveniently prepared by reduction of 10-(ω-cyanoalkyl)-trifluoromethylphenothiazines either by catalytic hydrogenation or lithium aluminum hydride. This reduction may take place in the presence of an appropriate amine to yield further alkylated derivatives. Also, the latter reaction is aptly applied to similar trifluoromethylphenothiazinyl-10-alkanals:

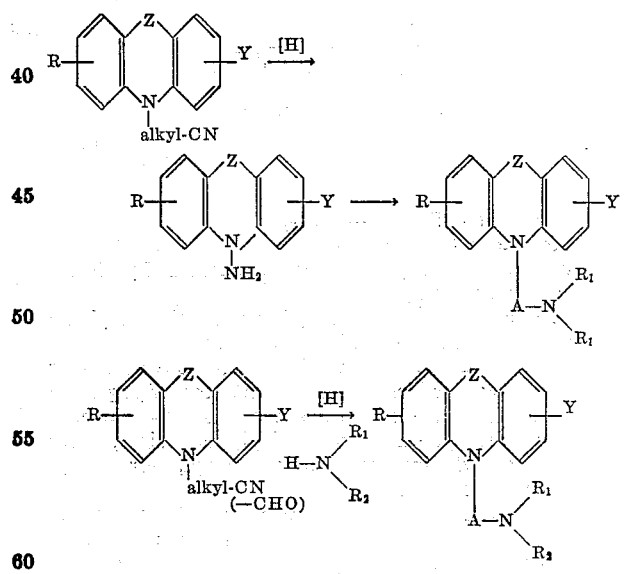

The foregoing 10-(ω-cyanoalkyl)-trifluoromethylphenothiazine derivatives are conveniently prepared by adding the appropriate trifluoromethylphenothiazine to an acrylonitrile under basic conditions as illustrated below:

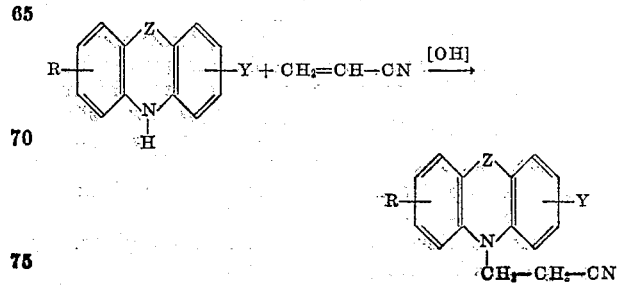

Alternatively, a more flexible procedure is to react a reactive ester of a 10-(ω-hydroxyalkyl)-trifluoromethylphenothiazine derivative, such as the tosylate, the preparation of which has been outlined above, with an inorganic cyanide, such as potassium cyanide or sodium cyanide, in aqueous alcoholic solution, as illustrated below:

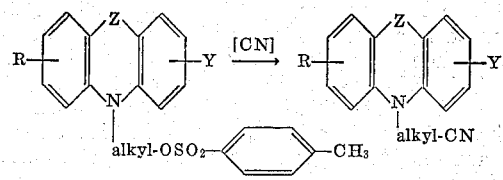

These 10-(ω-aminoalkyl)-trifluoromethylphenothiazine derivatives may be in certain cases primary or secondary amines, as well as tertiary amines; in the former instances, further alkylation may be carried out by methods known to the art, such as, for example, by an alkyl halide in the presence of an acid binder, such as sodium carbonate, or by reductive alkylation by an aldehyde or ketone in the presence of a reducing medium, such as in the presence of palladium-on-charcoal catalyst in a hydrogen atmosphere or of a formaldehyde-formic acid mixture [Org. Reactions, 4, 174 (1948)].

As a further example of the utility of the primary amines described hereabove, certain 10-(ω-heterocyclic-aminoalkyl)-trifluoromethylphenothiazine derivatives are prepared from the terminal primary amine derivatives by condensing the 10-(ω-aminoalkyl)-trifluoromethylphenothiazine with a substituted bis-(β-haloalkyl)-amine, such as an alkylbis-(β-haloalkyl)-amine, to give a 10-[ω-(N-substituted - piperazinyl) - alkyl] - trifluoromethylphenothiazine such as a 10-[ω-(N-alkylpiperazinyl)-alkyl]-trifluoromethylphenothiazine as specifically illustrated in the following scheme showing the formation of the N-alkyl-piperazinyl derivatives:

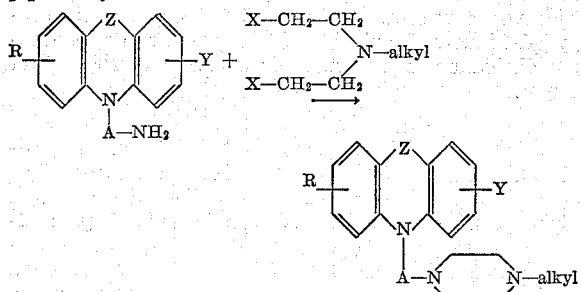

Easily removed groups may be substituted for the N-alkyl radical, such as a carbethoxy, benzyl or acyl group in order to obtain the unsubstituted piperazinylalkyltrifluoromethylphenothiazines by this method. Thus, for example, a protective benzyl group can be substituted and then removed by catalytic hydrogenation.

The 10-(ω-carboxyalkyl)-trifluoromethylphenothiazines, prepared by procedures known to the art, are alternative starting materials for the preparation of 10-(ω-aminoalkyl)-trifluoromethylphenothiazine derivatives of this invention. These phenothiazinyl carboxylic acids are converted to the amides, for example, by forming the acyl halide with thionyl chloride and then reacting with a suitable amine. The resulting 10-(ω-carboxamidoalkyl)-trifluoromethylphenothiazine derivative is then reduced to the desired 10-(ω-aminoalkyl)-triofluoromethylphenothiazine by reduction with strong reducing agents, such as lithium aluminum hydride. This procedure may be illustrated as follows:

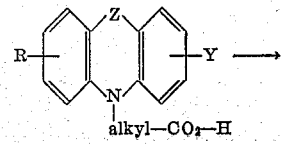

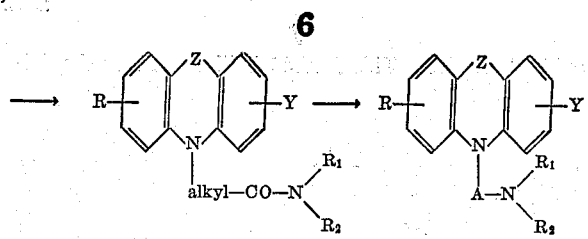

A different synthetic approach to the preparation of the compounds of this invention utilizes substituted 2-halo - x - trifluoromethyl - 2' - dialkylaminoalkylaminodiphenylamines. An intramolecular Ullmann reaction is run on the halogen compound, preferably the 2-bromo or 2-iodo analogue, using standard conditions with copper or copper bronze as catalyst.

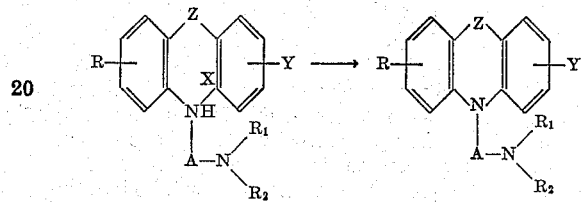

The foregoing is a general description of the main synthetic routes in the preparation of 10-(ω-aminoalkyl)-trifluoromethylphenothiazine derivatives. It will be readily apparent to one skilled in the art that variations of these procedures are possible. Of particular advantage as preparative procedures are the first two methods discussed, namely, alkylation of trifluoromethylphenothiazine derivatives in the 10-position of the nucleus by a reactive dialkylaminoalkyl ester and utilization of trifluoromethylphenothiazine derivatives substituted in the 10-position with aliphatic chains containing a reactive terminal group.

The 5-mono-oxide derivatives of the compounds of this invention are prepared conveniently by oxidizing a crystalline salt, for example, the oxalate of the base in an unreactive solvent, such as methanol, ethanol or water with one mole equivalent of an oxidizing agent, preferably 30% hydrogen peroxide solution or concentrated nitric acid as shown in the following scheme:

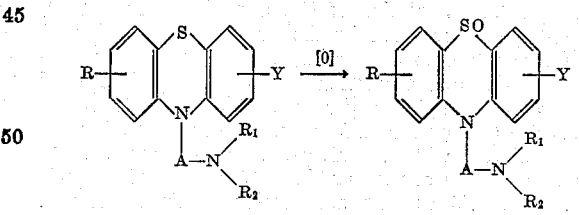

Alternately, the 5-mono-oxide of the trifluoromethylphenothiazine nucleus as the free base is coupled with a side chain by one of the various methods previously described, for instance, using a dialkylaminoalkyl chloride in xylene with sodamide as a condensing agent as shown in the following scheme:

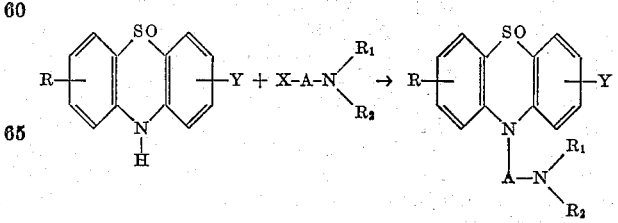

The 5-dioxide derivatives of the novel trifluoromethylphenothiazines of this invention are prepared conveniently by exhaustive oxidation with three mole equivalents of oxidizing agent, preferably 30% hydrogen peroxide solution. The N-oxide moiety of the resulting trioxide is then reduced with sodium hydrosulfite to give the 5-dioxide derivative. This method is illustrated by the following scheme:

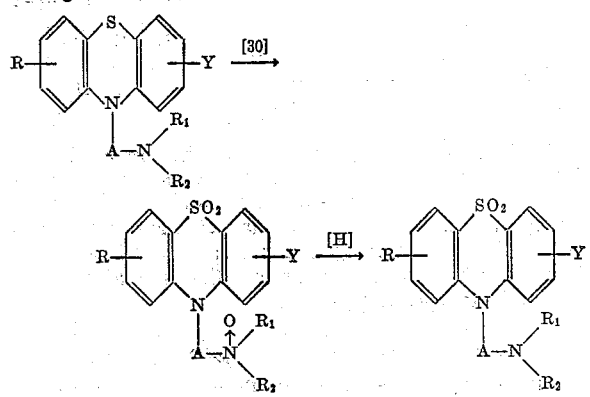

It will be readily apparent to one skilled in the art that certain of the compounds of this invention, notably those in which A is represented by an aliphatic carbon chain branched so that an asymmetric carbon atom is formed, may be present as optical isomers. The connotation of the general formulae presented herein is to include the separated d or l optical isomers as well as the dl mixture of these isomers. If desired, the isomers may be separated for individual use by resolution methods known to the art, such as fractional crystallization of the l-tartrate salts of the trifluoromethylphenothiazine derivatives. Alternatively, a synthesis starting with an optically active side chain may yield the desired optical isomer.

The following examples will be illustrative of compounds of this invention and the procedures for their preparation and will, it is believed, serve to make fully apparent all of the compounds embraced by the general formula given above and the preparation thereof respectively.

Example I

Approximately 3.8 g. of sodamide is freshly prepared from 2.25 g. of sodium, 90 g. of liquid ammonia and a catalytic trace of ferric nitrate. The ammonia is allowed to evaporate. A solution of 19.1 g. of 2-trifluoromethylphenothiazine (prepared by the Bernthsen thionation of 3-trifluoromethyldiphenylamine) in 160 ml. of dry benzene is added to the reaction flask followed by 18 g. of 3-chloro-1-dimethylaminopropane. The reaction mixture is heated at reflux for twenty hours. After washing the cooled mixture with 130 ml. of water, the organic layer is extracted with several portions of dilute hydrochloric acid. The acid extracts are combined and neutralized with ammonium hydroxide solution. The oily free base is extracted into benzene and purified by distillation to give 19.6 g. of 10-(3'-dimethylaminopropyl)-2-trifluoromethylphenothiazine, B.P. 177 to 181° at 1 mm.

The free base (7 g.) is converted to the hydrochloride salt by reacting an alcoholic solution of the base with hydrogen chloride gas. Evaporation of the volatiles in vacuo leaves an amorphous solid which is recrystallized from ethanol/ether to pink crystals, M.P. 173–4° C., the hydrochloride salt of the free base prepared above.

The citrate derivative is formed in like manner by reacting 3.5 g. of the free base with 2.1 g. of citric acid U.S.P., in 100 ml. of acetone. Concentrating the reaction mixture on the steam bath and cooling gives a mass of 10-(3'-dimethylaminopropyl)-2-trifluoromethylphenothiazine citrate.

A solution of 3.5 g. of the oily free base was dissolved in 50 ml. of ethyl acetate along with 0.95 g. of oxalic acid. After thorough shaking, the mixture was evaporated in vacuo. The crude residue was then recrystallized from ethanol/ether to give white crystals of 10-(3'-dimethylaminopropyl)-2-trifluoromethylphenothiazine oxalate.

Example II

A solution of 2 g. of 10-(3'-dimethylaminopropyl)-2-trifluoromethylphenothiazine oxalate prepared as in Example I in 150 ml. of ethanol is oxidized with 0.0045 mole of hydrogen peroxide supplied by 30% hydrogen peroxide solution with a reflux period of 10 hours. The volatiles are removed in vacuo. The amorphous salt is suspended in a small amount of water, neutralized with dilute sodium hydroxide solution and extracted into ether. The hydrochloride of 10-(3'-dimethylaminopropyl)-2-trifluoromethylphenothiazine-5-oxide is then isolated by passing hydrogen chloride gas into the dried ether extract and recrystallizing the separated product from ethanol/ether.

The 5-dioxide derivative of 10-(3'-dimethylaminopropyl)-2-trifluoromethylphenothiazine is prepared by oxidizing 2 g. of the oxalate salt of the parent compound with 3 mole equivalents of hydrogen peroxide as in the above procedure. The resulting trioxide is then reacted with sodium hydrosulfite in aqueous methanolic solution in order to reduce the N-oxide radical. This procedure gives the hydrochloride of 10-(3'-dimethylaminopropyl)-2-trifluoromethylphenothiazine-5-dioxide.

Example III

A suspension of 15 g. of 8-chloro-2-trifluoromethylphenothiazine (prepared by the Smiles rearrangement of 4-chloro - 2 - formamido - 2' - nitro - 5' - trifluoromethyldiphenyl sulfide), 3 g. of sodamide and 6.9 g. of 3-chloro-1-dimethylaminopropane in 450 ml. of xylene is heated at reflux for four hours. The cooled reaction mixture is diluted with 600 ml. of water and acidified with hydrochloric acid using Methyl Orange indicator. The acid solution is extracted with several portions of benzene. The oily base which separates after neutralization of the acid extracts with ammonium hydroxide solution is partially crystallized by cooling and trituration with water washes. 8-chloro-10-(3'-dimethylaminopropyl)-2-trifluoromethylphenothiazine is purified by a vacuum distillation to a viscous oil; B.P. 195 to 200° C. at 1 mm.

Example IV

A suspension of 2.5 g. of 8-chloro-2-trifluoromethylphenothiazine (prepared by the Smiles rearrangement of 4-chloro - 2 - formamido - 2' - nitro - 5' - trifluoromethyldiphenyl sulfide), 0.5 g. of sodamide and 1.3 g. of 2-chloro-1-pyrrolidinylbutane in 100 ml. of xylene is heated at reflux for six hours. Upon working up the reaction as in Example III, the oily base which is a mixture of 8-chloro-10-(2'-N-pyrrolidinyl-1'+2'-ethylethyl)-2-trifluoromethylphenothiazines is obtained as a semisolid after cooling for three days.

Example V

Three grams of 8-methoxy-2-trifluoromethylphenothiazine (prepared by Bernthsen thionation of 3'-methoxy-3-trifluoromethyldiphenylamine), 1.8 g. of 1-(3'-chloropropyl)-4-methylpiperazine and 0.5 g. of sodamide in 150 ml. of xylene is heated at reflux for four hours. The xylene solution is washed with water and extracted with dilute hydrochloric acid. The acid extracts are neutralized while swirling with sodium hydroxide pellets. The semisolid base which separates is then washed well with water, dried over sulfuric acid, taken up in isopropanol and treated with a stoichiometric amount (based on the crude weight of 3.8 g. of basic residue) of pamoic acid (bismethylenehydroxynaphthoic acid). Cooling separates the crude pamoate salt of 8-methoxy-10-[3'-(4''-methyl-1''-piperazinyl) - propyl]-2-trifluoromethylphenothiazine.

Example VI

Proceeding as in Example V with 8-ethoxy-2-trifluoromethylphenothiazine (prepared by Bernthsen thionation of 3'-ethoxy-3-trifluoromethyldiphenylamine) and 3-chloro-1-dimethylaminopropane, the crude pamoate salt of 10-(3'-dimethylaminopropyl) - 8 - ethoxy - 2 - trifluoromethylphenothiazine is obtained.

Example VII

A mixture 17.2 g. of 2-trifluoromethylphenothiazine, 3.1 g. of sodamide and 14 g. of 1-(3'-chloropropyl)-4-methylpiperazine in 200 ml. of xylene is heated at reflux for two hours. The salts are extracted into 150 ml. of water. The xylene layer is then extracted with several portions of dilute hydrochloric acid. The acid extracts are combined and neutralized with ammonium hydroxide solution. The product, 10-[3'-(4''-methyl-1''-piperazinyl)-propyl]-2-trifluoromethylphenothiazine, is taken into benzene and purified by vacuum distillation, B.P. 202 to 210° C. at 0.6 mm.

Four grams of the basic oil are treated with 2.2 g. of maleic acid in ethyl acetate. Cooling the concentrated solution caused the separation of crystals of 10-[3'-(4''-methyl-1''-piperazinyl) - propyl]-2-trifluoromethylphenothiazine dimaleate; M.P. 185° C. (dec.).

Example VIII

A solution of 19.5 g. of 3-bromo-1-piperidylpropane in 100 ml. of xylene is added dropwise at 100° C. to a stirred suspension of 28.1 g. of 8-methyl-2-trifluoromethylphenothiazine (prepared by thionation of 3'-methyl-3-trifluoromethyldiphenylamine) and 4.5 g. of powdered commercial sodium hydroxide in 100 ml. of xylene which had been previously stirred at reflux for eight hours. When the addition is complete, the mixture is heated at reflux for three hours. After water washing and acid extracting the organic layers, the free base is liberated from the acid extracts with ammonium hydroxide solution. Distillation in vacuo of the separated base which had been taken up in benzene gives a viscous oil, 8-methyl-10-(3'-N - piperidylpropyl) - 2 - trifluoromethylphenothiazine; B.P. 188 to 193° C. at 0.4 mm.

Example IX

10 - (3' - hydroxypropyl) - 2 - trifluoromethylphenothiazine p-toluene-sulphonate (24 g.) in 100 ml. of methanol is heated at 50° C. for ten hours in a medium pressure autoclave with an excess of methylamine dissolved in methanol. The autoclave is allowed to cool in a refrigerated room before opening. After removal of the volatiles in vacuo on the steam bath, the residue is extracted thoroughly with benzene. The base remains after evaportion of the dried extracts in vacuo. The crude hydrochloride of 10-(3'-methylaminopropyl)-2-trifluoromethylphenothiazine is formed by passing dry hydrogen chloride gas into a solution of 5 g. of the base in 150 ml. of ether.

Example X

A suspension of 19.1 g. of 2-trifluoromethylphenothiazine, 3.8 g. of sodamide and 12 g. of 6-bromo-1-dimethylaminohexane in 160 ml. of dry xylene is heated at reflux for forty hours. After working up as in Example I, a viscous oil, 10-(6'-dimethylaminohexyl)-2-trifluoromethyl-phenothiazine, is obtained by vacuum distillation.

Example XI

A suspension of 19.1 g. of 2-trifluoromethylphenothiazine, 1.6 g. of lithium hydride and 19 g. of 2-chloro-1-morpholinylethane in 200 ml. of dry benzene is heated at reflux for three hours after standing at room temperature in an inert atmosphere overnight. The reaction mixture is carefully diluted with 100 ml. of water. After extracting into acid solution, neutralizing with sodium hydroxide solution and extracting into benzene, the oily base, 10 - (2' - N - morpholinylethyl) - 2 - trifluoromethyl-phenothiazine, is obtained by evaporation in vacuo of the solvent.

Five grams of the base is reacted with 1.3 g. of maleic acid in ethyl acetate to give 10-(2'-N-morpholinylethyl)-2-trifluoromethylphenothiazine as the acid maleate salt.

Example XII

A suspension of 3.3 g. of 8-bromo-2-trifluoromethyl-phenothiazine (prepared by thionation of 3-bromo-3'-trifluoromethyldiphenylamine), 0.6 g. of potassium amide and 2-chloro-1-dimethylaminopropane in 50 ml. of xylene is heated at reflux for eight hours. The mixture is washed with water and extracted with two 50 ml. portions of dilute hydrochloric acid. The acid extracts are neutralized with ammonium hydroxide. After benzene extraction, the crude base residue is weighed. A solution of 2.1 g. of residual crude base in 10 ml. of ethyl acetate is reacted with 0.44 g. of bismethylenesalicylic acid. Concentration and cooling separates the crude 8-bromo - 10 - (dimethylaminoisopropyl) - 2 - trifluoromethylphenothiazine bismethylene salicylate which is purified by dissolving in dimethylacetamide and precipitating with water.

Example XIII

Twenty grams of 2,8-bistrifluoromethylphenothiazine (prepared by the Smiles rearrangement of 2-formamido-4 - trifluoromethyl - 2' - nitro - 5' - trifluoromethyldiphenyl sulfide) is alkylated following the procedure of Example I using sodamide as the acid-binding agent. Vacuum distillation gives 2,8-bistrifluoromethyl-10-(3'-dimethylaminopropyl)-phenothiazine, B.P. 190 to 195° C. at 1 mm.

Example XIV

A solution of 33 g. of 10-(2'-chloroethyl)-2-trifluoromethylphenothiazine (prepared by the reaction of ethylene oxide with 2-trifluoromethylphenothiazine followed by subsequent treatment of the β-hydroxyethyl compound with thionyl chloride) and 25 g. of anhydrous piperazine in 200 ml. of isoamyl alcohol is heated at reflux for twelve hours. The reaction mixture is then washed well with water. The organic layer is extracted with dilute hydrochloric acid. After neutralizing with ammonia and extracting with ethyl acetate, drying and evaporating the acetate extracts gives 5 g. of the crude base, 10-(2'-piperazinylethyl) - 2 - trifluoromethylphenothiazine. After molecular distillation of the residue, the dimaleate is prepared in ethyl acetate solution following the procedure of Example VII.

Example XV

Three grams of the base obtained in Example XIV is heated at reflux in aqueous methanol with one equivalent of ethyl p-toluenesulphonate with sodium carbonate for ten hours. The strongly basic residue after evaporation is extracted with ether. The dried ether extracts are combined and treated with gaseous hydrogen chloride to give crude 10-[2'-(4''-ethyl-1''-piperazinyl)ethyl]-2 - trifluoromethylphenothiazine dihydrochloride, M.P. 210–215° C. (dec.).

The acid fumarate salt of this base is prepared by combining 4.2 g. of the base with 2.6 g. of fumaric acid in ethanol and adding ether to cloudiness. The mixture is then cooled in a Dry Ice/isopropanol bath to separate the desired difumarate salt.

Example XVI

Twenty-eight grams of 10-(3'-dimethylaminopropyl)-2-trifluoromethylphenothiazine with 16.5 g. of 8-chlorotheophylline in 300 ml. of ethanol is heated at reflux for two hours. The solvent is allowed to evaporate on the steam bath to dryness. The residue is the 8-chlorotheophyllinate of 10-(3'-dimethylaminopropyl)-2-trifluoromethylphenothiazine of indefinite melting point about 90–95° C.

Example XVII

Sixteen grams of 10-(2'-cyanoethyl)-2-trifluoromethyl-phenothiazine (prepared by reacting 2-trifluoromethylphenothiazine with acrylonitrile under alkaline conditions) is suspended in 500 ml. of dry ethyl ether. A solution of 8 g. of lithium aluminum hydride in 250 ml. of ether is slowly added. The reaction mixture is then heated at reflux with stirring for twelve hours. The complex is carefully destroyed by the addition of methanol. After filtration, the filtrate is evaporated in vacuo. The residue is extracted with several 50 ml. portions of 10% hydrochloric acid. The combined acid extracts are neutralized with concentrated ammonium hydroxide solution. The separated base is taken into dry ether and treated with gaseous hydrogen chloride to give 10-(3' - aminopropyl) - 2 - trifluoromethylphenothiazine hydrochloride.

This base is also used to prepare further terminal secondary and tertiary amino groups by alkylation methods known to the art.

A suspension of 32.5 g. of 10-(3'-aminopropyl)-2-trifluoromethylphenothiazine and 14 g. of n-butylbromide in 100 ml. of ethanol is heated at reflux for four hours. The reaction mixture is cooled in order to add 15 g. of n-butylbromide, 15 g. of sodium carbonate and 40 ml. of water. The suspension is then heated at reflux with stirring for forty hours. The alcohol is then evaporated. After dilution with water, the organic base is extracted into benzene. The dried solvent is evaporated at the water pump to leave a thick, oily residue which is molecularly distilled to purify 10-(3'-dibutylaminopropyl) - 2 - trifluoromethylphenothiazine.

Example XVIII

A mixture of 10 g. of 10 - (2' - piperazinylethyl) - 2 - trifluoromethylphenothiazine (prepared as in Example XIV) in 50 ml. of 85% formic acid solution is warmed to 50° C. and 15 ml. of 37% formalin solution is added over a 15 minute period. The reaction mixture is held at 50 to 60° C. until the evolution of carbon monoxide ceases. The mixture is neutralized with dilute sodium hydroxide solution to give an insoluble oil. This base is extracted into benzene and vacuum distilled to give 10-[2'-(4''-methyl-1''-piperazinyl)-ethyl]-2-trifluoromethylphenothiazine as a clear oil, B.P. 205 to 210° C. at 0.5 mm.

Example XIX

A suspension of 27 g. of 2-trifluoromethylphenothiazine and 4.3 g. of sodamide in 100 ml. of xylene is heated at reflux for thirty minutes with efficient stirring. A solution 17 g. of 1-dimethylamino-2,2-dimethyl-3-bromopropane in 100 ml. of xylene is slowly added to the stirred reaction mixture over one hour. The mixture is then allowed to reflux with stirring for ten hours. The desired 10-(2',2'-dimethyl-3'-dimethylaminopropyl)-2-trifluoromethylphenothiazine, B.P. 160 to 165° C. at 1.5 mm. is isolated following the procedure of Example I.

Example XX

A suspension of 13.4 g. of 2-trifluoromethylphenothiazine and 2.7 g. of sodamide in 150 ml. of xylene is heated at reflux for thirty minutes. A solution of 7 g. of 1-chloro-3-dimethylamino-2-methylpropane (prepared by reverse addition of hydrogen bromide to methallyl chloride and selective reaction of the resulting 1-bromo-3-chloro-2-methylpropane with dimethylamine) in 50 ml. of xylene is added slowly to the reaction mixture while stirring and heating. After a reaction period of ten hours, the desired base, 10-(3'-dimethylamino-2'-methylpropyl)-2-trifluoromethylphenothiazine is isolated in crude form as in Example I. The crude base (16 g.) is taken up in ethyl acetate and reacted with gaseous hydrogen chloride to give the hydrochloride salt.

Example XXI

A suspension of 28.1 g. of 7-methyl-2-trifluoromethylphenothiazine (prepared by the Bernthsen thionation of 4'-methyl-3-trifluoromethyldiphenylamine) and 0.85 g. of lithium hydride in 100 ml. of xylene is heated at reflux for one hour when a solution of 12.5 g. of 3-chloro-1-dimethylaminopropane in 50 ml. of xylene is added dropwise over a period of one hour with stirring and heating. After a reflux period of ten hours, the reaction mixture is cooled and washed with 100 ml. of water carefully. The organic layer is extracted with several portions of dilute hydrochloric acid. After neutralization of the acid extracts with dilute sodium hydroxide, the base is extracted into benzene and purified by molecular distillation to give a viscous oil, 10-(3'-dimethylaminopropyl)-7-methyl-2-trifluoromethylphenothiazine.

Example XXII 2-trifluoromethylphenothiazine (13.4 g.) is alkylated with 8.5 g. of 3-chloro-1-morpholinylpropane using 2 g. of sodamide as an acid-binding reagent in xylene following the procedure of Example I to give a viscous oil, 10-(3'-N-morpholinylpropyl)-2-trifluoromethylphenothiazine, B.P. 210 to 215° C. at 1.5 mm.

Example XXIII

A suspension of 26.7 g. of 2-trifluoromethylphenothiazine and 4 g. of sodamide in 150 ml. of xylene is heated at reflux in xylene with 13.7 g. of 4-bromo-1-dimethylaminobutane with stirring for thirty hours. Upon working up the reaction mixture following the procedure of Example XXI, 10-(4'-dimethylaminobutyl)-2-trifluoromethylphenothiazine, B.P. 183–187° C. at 0.5 mm., is obtained.

Example XXIV

A suspension of 14.3 g. of 8-fluoro-2-trifluoromethylphenothiazine (prepared by thionation of 3-fluoro-3'-trifluoromethyldiphenylamine) and 2 g. of sodamide in 100 ml. of xylene is heated at reflux with stirring for one hour when a solution of 6.5 g. of 3-chloro-1-dimethylaminopropane in 50 ml. of xylene is added dropwise. The reflux period is continued for ten hours. Upon working up the reaction mixture as in Example V, 10.5 g. of crude base is obtained. This base is taken up in 250 ml. of ethyl acetate and reacted with 6.7 g. of pamoic acid to give the crude 8-fluoro-10-(3'-dimethylaminopropyl)-2-trifluoromethylphenothiazine pamoate. This insoluble salt is shaken with a mixture of xylene and saturated sodium carbonate solution to recover the purified 8-fluoro-10-(3'-dimethylaminopropyl)-2-trifluoromethylphenothiazine (8.7 g.) after drying the xylene layers and distilling the organic volatiles in vacuo. The crystalline citrate is then prepared by reacting 5 g. of the base with 2.6 g. of citric acid in ethyl acetate.

Example XXV

Three grams of 7-chloro-2-trifluoromethylphenothiazine (prepared by thionation of 4'-chloro-3-trifluoromethyldiphenylamine) is alkylated with 3-chloro-1-dimethylaminopropane following the procedure of Example XXIV. The crude, insoluble 7-chloro-10-(3-dimethylaminopropyl)-2-trifluoromethylphenothiazine pamoate is obtained from the reaction mixture.

Example XXVI

A mixture of 18 g. of 10-(3'-chloro-2'-methylpropyl)-2-trifluoromethylphenothiazine (prepared by the condensation of 1-bromo-3-chloro-2-methylpropane with 2-trifluoromethylphenothiazine) and 25 g. of N-methylpiperazine in 100 ml. of methanol is heated at reflux for three days. The volatiles are removed in vacuo on the steam bath. The residue is shaken with sodium hydroxide pellets and washed with 100 ml. portions of water, then extracted with benzene. The dried organic extracts are evaporated at the water pump to give crude 10-[2'-methyl-3'-(4''-methyl-1''-piperazinyl) - propyl]-2-trifluoromethylphenothiazine which is purified by recrystallization of the dimaleate salt from ethanol/water.

Example XXVII

A suspension of 26.7 g. of 2-trifluoromethylphenothiazine and 8.0 g. of freshly prepared sodamide in 200 ml. of xylene is heated at reflux with stirring while 27.5 g. of 3-bromo-1-pyrrolidinylpropane hydrobromide is added in small portions. The mixture is then heated with stirring at reflux for fifteen hours. The mixture is cooled and worked up as in Example I. Vacuum distillation gives a viscous oil, B.P. 175 to 180° C. at 0.7 mm., 10-(3'-N-pyrrolidinylpropyl)-2-trifluoromethylphenothiazine.

A solution of 3.8 g. of the oily base in 100 ml. of ethyl ether is reacted with 1 ml. of glacial acetic acid. A fluffy white solid acetate salt separates upon reduction of volume and cooling.

A solution of 3.8 g. of the base in ether is reacted with hydrogen bromide gas to give the hydrobromide salt of 10-(3'-N-pyrrolidinylpropyl)-2-trifluoromethylphenothiazine. This salt is then recrystallized from ethanol/ether.

Example XXVIII

A suspension of 19.1 g. of 4-trifluoromethylphenothiazine (prepared by the Bernthsen thionation of 3-trifluoromethyldiphenylamine) and 3.8 g. of sodamide in 150 ml. of benzene is heated at reflux with stirring. A solution of 18 g. of 3-chloro-1-dimethylaminopropane in 50 ml. of benzene is added. The reflux period is continued for sixteen hours. The cooled mixture is washed well with water. The benzene layer is then extracted with 10% hydrochloric acid. Neutralization of the acid extracts with sodium hydroxide solution gives an oily base which is purified by benzene extraction and vacuum distillation. A clear oil, 10-(3'-dimethylaminopropyl)-4-trifluoromethylphenothiazine is fractionated at 205 to 212° C. at 1.4 mm.

Example XXIX

Fifteen grams of 6-chloro-2-trifluoromethylphenothiazine (prepared by the Smiles rearrangement of 2-chloro-6-formamido-2'-nitro-5'-trifluoromethyldiphenylsulfide) is reacted with 6.9 g. of 3-chloro-1-dimethylaminopropane in the presence of 3 g. of sodamide in xylene. After working up the reaction mixture as in Example I, a viscous oil, 6 - chloro - 10 - (3' - dimethylaminopropyl) - 2 - trifluoromethylphenothiazine, is obtained by vacuum distillation, B.P. 209 to 216° C. at 0.3 mm.

This oily base, 3.9 g., is reacted with 1.2 g. of maleic acid in 40 ml. of ethyl acetate. Concentration and cooling gives a good yield of crystalline maleate salt.

Example XXX

A suspension of 26.8 g. of 2-trifluoromethylphenothiazine, 4.0 g. of sodamide and 18 g. of 3-chloro-1-(N-thiomorpholinyl)-propane in 150 ml. of xylene is heated at reflux for twelve hours. The oily base, 10-[3'-(N-thiomorpholinyl) - propyl] - 2 - trifluoromethylphenothiazine is isolated following the procedure of Example I, B.P. 225 to 236° C. at 1.0 to 1.5 mm.

Example XXXI

A suspension of 10 g. of 8-butyl-2-trifluoromethylphenothiazine-5-oxide (prepared by thionation of 3'-butyl-3-trifluoromethyldiphenylamine and subsequent oxidation of the resulting 8-butyl-2-trifluoromethylphenothiazine), 1.6 g. of sodamide and 7 g. of 1-(3'-chloropropyl)-4-methylpiperazine in 75 ml. of xylene is heated for thirty hours. The cooled reaction mixture is diluted with 200 ml. of water and acidified with dilute hydrochloric acid. After washing with several portions of chloroform, the product is separated by neutralizing the aqueous layer with sodium carbonate solution. The base is extracted into ethyl acetate. Concentration and addition of isooctane to the dried ethyl acetate solution separates the crude solid base, 6-butyl-10-[3'-(4''-methyl-1''-piperazinyl)-propyl]-2-trifluoromethylphenothiazine-5-oxide.

Example XXXII 4-trifluoromethylphenothiazine (9.6 g.) is alkylated with 10 g. of 3-chloro-1-diethylaminopropane and 1.9 g. of sodamide in 100 ml. of xylene following the procedure of Example I. A clear, oily liquid, 10-(3'-diethylaminopropyl) - 4 - trifluoromethylphenothiazine, is isolated by vacuum distillation, B.P. 215 to 222° C. at 1.5 mm.

Example XXXIII

A solution of 32.5 g. of 10-(3'-aminopropyl)-2-trifluoromethylphenothiazine (prepared as in Example XVII), 21 g. of butyl bis-(β-chloroethyl)-amine in 300 ml. of butanol is heated at reflux for eight hours. Tributylamine (40 ml.) is added to the mixture and the reflux period is extended for eight hours. The volume of the reaction mixture is reduced on the steam bath at the water pump. After dilution of the residue with water, the base is extracted into chloroform. The dried chloroform extracts are concentrated. The basic residue is fractionally distilled to give an oily base, 10-[3'-(4''-butyl - 1'' - piperazinyl) - propyl] - 2 - trifluoromethylphenothiazine, B.P. 202 to 207° C. at 0.05 mm.

Example XXXIV

A suspension of 5.6 g. of 6-methyl-2-trifluoromethylphenothiazine (prepared by the Smiles rearrangement of 2 - methyl - 6 - formamido - 2' - nitro - 5' - trifluoromethyldiphenylsulfide), 3 g. of 3-chloro-1-diethylaminopropane and 0.8 g. of sodamide in 25 ml. of xylene is heated at reflux with stirring for fifteen hours. The crude pamoate salt of 10-(3'-diethylaminopropyl)-6-methyl-2-trifluoromethylphenothiazine, characterized by infrared spectra, is isolated following the procedure of Example V.

Example XXXV

A mixture of 26.8 g. of 2-trifluoromethylphenothiazine and 4.0 g. of sodamide in 200 ml. of xylene is heated at reflux with stirring while a solution of 17.6 g. of 1-chloro-2-(pyrrolidinylmethyl)-butane (prepared by a Mannich reaction on butyraldehyde, reduction of the resulting Mannich base and finally halogenation of the aminoalcohol) in 100 ml. of xylene is added dropwise over a period of ten hours. The reaction mixture is then heated at reflux for another two hours and worked up as in Example I to yield a very viscous oil which solidifies to a semisolid after prolonged standing; 10-(2'-pyrrolidinylmethylbutyl)-2-trifluoromethylphenothiazine.

Example XXXVI

Twenty-seven grams of 2-trifluoromethylphenothiazine is alkylated with 17.8 g. of 3-chloro-1-hexahydroazepinylpropane [prepared by condensation of 3-bromo-1-chloropropane and hexahydroazepine (hexamethyleneimine)] and 4.3 g. of sodamide in 200 ml. of xylene following the procedure of Example I. Distillation of the crude base isolated from the reaction mixture gives a very viscous oil, 10 - (3'-hexahydroazepinylpropyl)-2-trifluoromethylphenothiazine, as the fraction with a boiling point of 198 to 200° C. at 0.5 mm.

What is claimed is:

1. A therapeutic compound of the class consisting of a free base and its nontoxic acid addition salts, the free base having the formula:

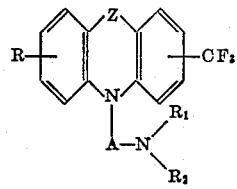

in which Z is a member selected from the group consisting of —S— and —SO—; R is a member selected from the group consisting of hydrogen, halogen, trifluoromethyl, lower alkyl and lower alkoxyl; A is lower alkylene having at least two carbon atoms separating the two nitrogen atoms to which it is attached and; $R_1$ and $R_2$ are members selected from the group consisting of hydrogen, lower alkyl and, when taken together with the nitrogen to which they are attached, pyrrolidinyl, piperazinyl, lower alkyl-piperazinyl, piperidyl, thiomorpholinyl, morpholinyl and hexahydroazepinyl.

2. A therapeutic compound having the fundamental structural formula:

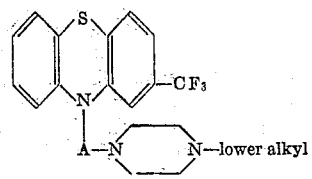

in which A is lower alkylene having at least two carbon atoms separating the two nitrogen atoms to which it is attached.

3. A therapeutic compound having the fundamental structural formula:

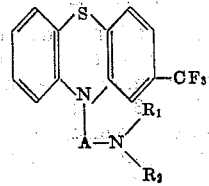

in which A is lower alkylene having at least two carbon atoms separating the two nitrogen atoms to which it is attached; and $R_1$ and $R_2$ are lower alkyl.

4. A therapeutic compound having the fundamental structural formula:

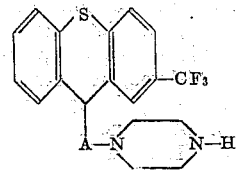

in which A is lower alkylene having at least two carbons separating the two nitrogen atoms to which it is attached.

5. A therapeutic compound having the fundamental structural formula:

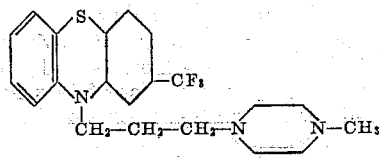

6. 10 - [3' - (4" - methyl -1" - piperazinyl) - propyl]-2-trifluoromethylphenothiazine dimaleate.

7. A therapeutic compound having the fundamental structural formula:

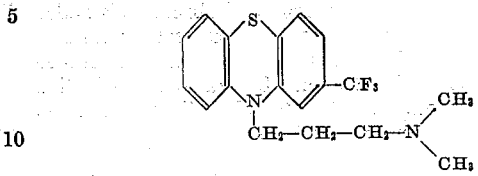

8. 10 - (3' - dimethylaminopropyl) - 2 - trifluoromethylphenothiazine hydrochloride.

9. A therapeutic compound having the fundamental structural formula:

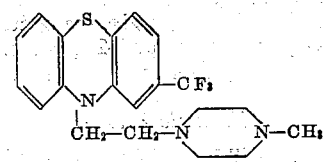

10. A therapeutic compound having the fundamental structural formula:

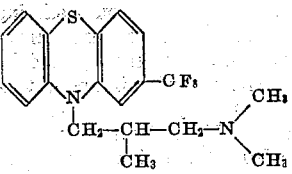

11. A therapeutic compound having the fundamental structural formula:

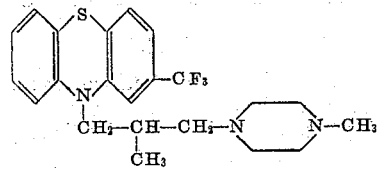

12. A therapeutic compound having the fundamental structural formula:

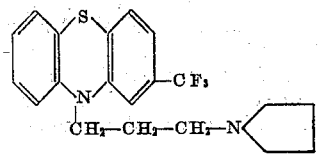

References Cited in the file of this patent
UNITED STATES PATENTS

| | | |
|---|---|---|
| 2,534,237 | Cusic | Dec. 19, 1950 |
| 2,645,640 | Charpentier | July 14, 1950 |